(12) United States Patent
Merry et al.

(10) Patent No.: US 7,848,188 B2
(45) Date of Patent: Dec. 7, 2010

(54) DEVICE AND METHOD FOR USE IN OPTICAL RECORD CARRIER SYSTEMS

(75) Inventors: Roel Johannes Elisabeth Merry, Eindhoven (NL); Martin Leist, Giessen (DE); Marcel Rieck, Friedberg (DE)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 477 days.

(21) Appl. No.: 11/720,522

(22) PCT Filed: Dec. 1, 2005

(86) PCT No.: PCT/IB2005/054005

§ 371 (c)(1), (2), (4) Date: May 31, 2007

(87) PCT Pub. No.: WO2006/061748

PCT Pub. Date: Jun. 15, 2006

(65) Prior Publication Data

US 2009/0129216 A1 May 21, 2009

(30) Foreign Application Priority Data

Dec. 6, 2004 (EP) .................................. 04106317

(51) Int. Cl.
*G11B 7/00* (2006.01)
(52) U.S. Cl. .............. 369/44.29; 369/44.25; 369/44.27; 369/44.32; 369/53.13
(58) Field of Classification Search .............. 369/44.25, 369/44.27, 44.29, 53.13, 44.32, 44.35, 44.22
See application file for complete search history.

(56) References Cited

U.S. PATENT DOCUMENTS

| 4,674,076 A | | 6/1987 | Hsieh et al. | |
|---|---|---|---|---|
| 4,811,194 A | * | 3/1989 | Tominaga | ................. 369/44.32 |
| 5,187,696 A | | 2/1993 | Ishii et al. | |
| 5,363,357 A | * | 11/1994 | Niwayama | ................. 369/44.27 |

(Continued)

FOREIGN PATENT DOCUMENTS

EP 0217460 A1 4/1987

(Continued)

*Primary Examiner*—Thuy N Pardo
(74) *Attorney, Agent, or Firm*—WPAT., P. C.; Justin King

(57) ABSTRACT

A signal-processing device (301) for controlling a focus actuator (309) in an optical disc system (30), wherein the signal processing device (309) generates a focus actuator control signal (CS) to be supplied to the focus actuator (309). The focus actuator control signal (CS) is based on a focus error signal (FE) and a central aperture signal (CA). If the central aperture signal (CA) is equal to or above a certain threshold value the focus actuator control signal will correspond to the focus error signal (FE). However, when the central aperture signal is below the threshold value the focus actuator control signal will have a predefined level. By providing a focus actuator control signal (CS) in accordance herewith it is possible to extend the regions of the focus error signal (FE) in which the relative distance between the focus point and the data layer of the record medium (304) is not correctly represented. The provision of the control signal (CS) enables improvements of the start-up and recovery performance of optical disc systems, especially under vibrating conditions.

24 Claims, 10 Drawing Sheets

U.S. PATENT DOCUMENTS

| | | | |
|---|---|---|---|
| 6,731,574 B1 * | 5/2004 | Abe et al. | 369/44.32 |
| 7,480,222 B2 * | 1/2009 | Van De Ven | 369/53.22 |
| 2002/0039332 A1 * | 4/2002 | Komoike et al. | 369/44.29 |
| 2002/0131344 A1 * | 9/2002 | Kadlec et al. | 369/44.29 |
| 2003/0012093 A1 * | 1/2003 | Tada et al. | 369/44.27 |
| 2004/0076090 A1 * | 4/2004 | Ishibashi et al. | 369/44.29 |
| 2005/0141361 A1 * | 6/2005 | Oh et al. | 369/44.25 |
| 2005/0213454 A1 * | 9/2005 | Huang et al. | 369/53.13 |

FOREIGN PATENT DOCUMENTS

| | | |
|---|---|---|
| EP | 1508897 A2 | 2/2005 |
| JP | 08045169 | 2/1996 |
| JP | 2000149392 | 5/2000 |
| JP | 2001209950 | 8/2001 |
| WO | WO2004059649 A1 | 7/2004 |
| WO | WO2006040733 A1 | 4/2006 |

\* cited by examiner $$u = i \cdot R \quad (1)$$

$$u = P \cdot e \quad (2)$$

$$X = \underbrace{\frac{Bl}{mLs^3 + (Rm+Ld)s^2 + (Rd+Lk+(Bl)^2)s+Rk}}_{H} U \quad (3)$$

$$U = P \underbrace{\frac{\frac{3}{\omega BW}s+1}{\left(\frac{1}{3\omega BW}s+1\right)\left(\frac{1}{10\omega BW}s+1\right)}}_{C} E \quad (4)$$

$$CH = \frac{PBl\left(\frac{3}{\omega BW}s+1\right)}{\left(mLs^3+(Rm+Ld)s^2+\left(Rd+Lk+(Bl)^2\right)s+Rk\right)\left(\frac{1}{3\omega BW}s+1\right)\left(\frac{1}{10\omega BW}s+1\right)}$$

$$= \frac{30PBl(3s+\omega BW)\omega BW)}{\left(mLs^3+(Rm+Ld)s^2+\left(Rd+Lk+(Bl)^2\right)s+Rk\right)(s+3\omega BW)(s+10\omega BW)} \quad (5)$$

FIG. 9

$$CH(s=j\omega_{BW}) = \frac{PBl\left(\frac{204}{101} + \frac{222}{101}j\right)}{-jmL\omega_{BW}^3 - (Rm+Ld)\omega_{BW}^2 + j\left(Rd+Lk+(Bl)^2\right)\omega_{BW} + Rk} \quad (6)$$

$$= \frac{PBl\left(\frac{204}{101} + \frac{222}{101}j\right)}{(-(Rm+Ld)\omega_{BW}^2 + Rk) + \left(\left(Rd+Lk*(Bl)^2\right)\omega_{BW} - mL\omega_{BW}^3\right)j} \quad (7)$$

$$|CH| = \frac{PBl\frac{30}{101}\sqrt{101}}{\sqrt{(-(Rm+Ld)\omega_{BW}^2+Rk)^2 + \left(\left(Rd+Lk*(Bl)^2\right)\omega_{BW} - mL\omega_{BW}^3\right)^2}} = 1 \quad (8)$$

$$\longrightarrow P = \frac{\sqrt{(-(Rm+Ld)\omega_{BW}^2+Rk)^2 + \left(\left(Rd+Lk*(Bl)^2\right)\omega_{BW} - mL\omega_{BW}^3\right)^2}}{Bl\frac{30}{101}\sqrt{101}} \quad (9)$$

FIG. 9A

DEVICE AND METHOD FOR USE IN OPTICAL RECORD CARRIER SYSTEMS

The present invention pertains in general, but not exclusively, to a device and a method for use in optical disc systems. Particularly the invention concerns a signal-processing device for controlling a focus actuator in an optical disc system and a method of controlling a focus actuator in an optical disc system. The device and method provide an improved start-up and recovery behaviour of optical disc systems, especially under the influence of vibrations.

As one of the conventional recording media for audio information, video information and data optical discs, from which recorded information is read using a light beam or to which information is written using a light beam, are nowadays widely used. Such optical discs, i.e. for example Compact Discs (CD) or Digital Versatile Discs (DVD), are formed from a single plastic plate-like substrate. Optical discs store the information as digital data on the disc and have a large storage capacity. The innermost part of the optical disc does not hold data. Instead, the digital data is physically contained in pits located along a spiral track or a number of circular tracks on a top surface of the disc. These pits are covered with a very thin metal layer. The layer in which data is contained is commonly known as the information layer or the data layer. Digital data from the optical disc is accessed by an optical disc system by means of a light beam, such as a laser beam. This is achieved by applying the light beam from below so that it passes through the transparent substrate and back again. The light beam is focused on the metalized data layer embedded in the optical disc, thereby enabling reading off the data from the optical disc.

Optical discs are played in optical disc systems. Conventional optical disc systems comprise an optical pick-up device having a laser unit, whose light beam which has been reflected and modulated by the disc is detected and subsequently converted into an electric signal, which is applied to a signal processing device that recovers the original audio information from the applied signal. The laser unit further has an objective lens. Its purpose is to focus the laser beam on the data layer of the optical disc, taking into account e.g. the refractive index of the optical disc. Moreover, the optical pick-up device has a focus actuator that actuates the objective lens in the focus direction, thereby enabling the light beam to be focused onto a point at the disc that corresponds to a point at the data layer of the disc. In order to perform radial tracking, the laser unit can be moved over the optical disc in a radial direction. The purpose of the radial tracking is to follow/track the spiral track or circular tracks mentioned previously. Furthermore, the radial tracking can be accomplished in various ways, which are known in the art. It is important that the laser beam follows the track very accurately. For this purpose the system comprises a tracking control device, which in response to a radial error signal from the optical pick-up device controls the radial position of the laser unit so as to reduce the error signal. In addition, the laser beam should remain accurately focused on the disc despite a possible out-of-flatness of the disc. For this purpose the system comprises a focus-control device, which keeps the laser beam focused on the disc in response to a focus error signal from the optical pick-up device. In principle the above-mentioned control devices are feedback systems in which a correction is performed in response to a detected error so as to reduce the error. These control devices are capable of coping with errors occurring during normal use of the optical disc system.

However, it has turned out that optical disc systems are sensitive to vibrations. For instance, if the optical disc system is constructed as a portable disc system or if the disc system is mounted in a car, vibrations and shocks may occur which can no longer be eliminated by the control devices inherent in the optical disc system. In particular, vibrations and shocks may give rise to comparatively large changes in the position of the optical pick-up device relative to the optical disc. This may result in that a start-up or recovery process fails. Even worse, it could potentially result in a damaged optical pick-up device or a damaged optical disc.

In prior art, different methods have been suggested for providing apparatuses that are less sensitive to vibrations. For instance, it has been proposed to control the focusing and speed in optical disc systems. One such apparatus has been suggested in EP 0 217 460. This apparatus uses acceleration transducers for reducing the shocks and vibrations during the start-up and play of optical discs, such as e.g. CDs. However, there are disadvantages associated with this apparatus. For example, the transducers are quite expensive.

Furthermore, it has turned out that in new generation optical disc systems, which are reduced in size and more compact, the acceleration of the optical pick-up device may increase substantially during vibrating conditions. Thus, when the focus actuator is subjected to vibrations it has turned out that during start-up and recovery conditions the control device(s) that control(s) the focus actuator in the optical disc system is not always able to keep a focus error within the region in which position information is available for the control device. This will now be described in further detail, reference being made to FIGS. 1 and 2.

FIG. 1 illustrates a focus error signal, which is produced on the basis of the light beam emitted from the optical pick-up device and reflected from the data layer of the optical disc. The focus error signal is available in a relatively small range around a focus point. In this specification the term focus point is referred to the point at which a focal point of the objective lens is located. The focus error signal, which has a so-called S-shaped characteristic, is shown as a relative distance between the focus point and the data layer of the optical disc. The focus error signal has zero crossings O when the objective lens is at a proper focusing position, i.e. when the focus point is located at the data layer of the disc. So, if the laser beam is not focused correctly, i.e. the objective lens is positioned incorrectly, then the focus error (i.e. the relative distance between the focus point and the data layer of the optical disc) does not equal zero. When the laser beam is not focused correctly, the objective lens may have deviated from the proper focusing position O in either of two directions, namely either in a negative direction (denoted with X in FIG. 1) or in a positive direction (denoted with Y) in relation to the proper focusing position. When the objective lens deviates in the negative direction the focus error is said to have a negative sign. Likewise, when the objective lens deviates in the positive direction the focus error signal is said to have a positive sign. For illustrative purposes only the S-shaped curve has been divided into regions A, B, and C. In optical disc systems, the S-shaped curve determines the range in which position information is available for a control device that controls the focus actuator that in turn performs the positioning of the objective lens. The position information is information concerning the relative distance between the focal point of the objective lens and the data layer of the record medium. It has turned out that when the control device uses the focus error signal directly it can be active only in the region denoted with an A. In region A the relative distance between the focus point and the data layer of the optical disc is correctly represented. In regions B and C of the S-curve in FIG. 1 the relative distance between the focus point and the data layer of the optical disc is however not correctly represented. For minor vibration disturbances the control device that controls the focus actuator may potentially be able to keep the focus error within the A-region. However, when the optical disc system is subjected to other vibrating disturbances it has turned out that the control device is not always able to keep the focus error within the A-region. Thus, under such vibrating conditions, when an objective lens once deviates from the proper focusing position to such extent that the focus error is not within the A-region, then the control device is not active any longer and the objective lens cannot be controlled back to the data layer of the optical disc by the control device. This may consequently result in e.g. a failed start-up or recovery. Accordingly, the start-up and recovery performance of the system is poor. For optical disc systems that are often subjected to vibrations, e.g. automotive applications, such poor performance is unacceptable.

FIG. 2 illustrates a central aperture signal. It is produced on the basis of the light beam emitted from the optical pick-up device and reflected from the data layer of the optical disc. It is a measure of the intensity of the reflected light. The central aperture signal is, similar to the focus error signal available in a relatively small range around the focus point. When the objective lens is at a proper focusing position the amount of reflected light approaches its peak value. As such, FIG. 2 shows the intensity of reflected light as a function of the relative distance between the focus point and the data layer of the disc. So, when the objective lens is at a proper focusing position the signal value of the central aperture signal is at its maximum level. The more the objective lens deviates from the proper focusing position the lower is the signal value. This is because the amount of the reflected light decreases when the objective lens deviates from the proper focusing position.

Consequently, there is a clear relation between the focus error signal shown in FIG. 1 and the central aperture signal shown in FIG. 2. As can be seen in FIG. 1 region B starts when the focus error signal reaches its minimum and maximum level, respectively. The transition from the A-region to the B-region corresponds to a certain threshold value of the central aperture signal shown in FIG. 2. A central aperture signal having a signal value equal to or above the threshold value corresponds to the case when the focus error is within region A of the focus error signal. Similarly, a central aperture signal having a signal value that is below the threshold value corresponds to the case when the focus error is outside region A of the focus error signal. Accordingly, when the value of central aperture signal is below this certain threshold value the objective lens cannot be controlled back to the data layer of the optical disc by the control device(s).

Hence, it would be advantageous to provide an improved device and method that improves the start-up and/or recovery performance of an optical disc system that is subjected to disturbances such as vibrations.

An object of the present invention is to provide an improved device and method, which seeks to mitigate, alleviate or eliminate one or more of the above-identified deficiencies in the art and disadvantages singly or in any combination.

The object is achieved by a signal-processing device according to the independent claim 1. The signal-processing device is capable of generating a focus actuator control signal for controlling the focus actuator based on a focus error signal and a central aperture signal. When the central aperture signal is equal to or above a threshold value said focus actuator control signal corresponds to the focus error signal. However, when the central aperture signal is below the threshold value a focus actuator control signal having a predefined level is generated by the signal-processing device. According to the invention, the focus error signal generally corresponds to a relative distance between a focus point and a data layer of a record medium to be read or written by said optical disc system. Furthermore, the central aperture signal generally corresponds to an amount of reflected light from a record medium to be read by said optical disc system.

Thus it is provided a signal-processing device which provides a focus actuator control signal that extends the focus error signal in the regions where the relative distance between the focus point and the data layer of the record medium is not correctly represented by the focus error signal. So, under vibrating conditions, if an objective lens has once deviated from the proper focusing position to such extent that the focus error is outside the region where the relative distance between the focus point and the data layer of the record medium is correctly represented by the focus error signal, the provision of the focus actuator control signal has the advantage that it enables at least one controller, that controls the focus actuator, to determine in which direction the objective lens should be moved in order to find a proper focusing position again.

According to one embodiment of the invention, the optical disc system, in which the signal-processing device is implemented, further comprises at least one controller that further controls the focus actuator. The at least one controller is able to control the damping operation and the tracking operation of the focus actuator. The focus actuator control signal is supplied to the at least one controller. Thus, if the optical disc system is subjected to vibrations it is possible to provide an optical disc system with at least one controller that is configured to first dampen the focus actuator at start-up and recovery to such extent that the at least one controller is then able to perform its tracking operation again.

According to another embodiment of the invention the optical disc system further comprises two controllers, of which one is a damping controller and one is a tracking controller. Preferably, the damping controller is a PD controller and the tracking controller a PID controller. Furthermore, the signal-processing device is preferably configured to determine the velocity of the focal point of the objective lens relative to the data layer of the record medium and to deactivate the damping controller and activate the tracking controller when the record medium passes through the focus point and said velocity is lower than a predefined value. Thus, under this condition the tracking operation of the focus actuator is activated. Alternatively, or additionally, the signal-processing device can also be configured to deactivate the damping controller (513*a*) and activate the tracking controller (513*b*) when the central aperture signal (CA) is equal to or above the threshold value during two or more consecutive zero crossings of the focus error signal (FE). Under this condition, the focus error stays in the region where the relative distance between the focus point and the data layer of the record medium is correctly represented by the focus error signal during two or more consecutive zero crossings of the focus error signal. This means that the dampening of the focus actuator is sufficient and the tracking operation of the focus actuator is thus activated. However, if the central aperture signal is below the threshold value the damping controller is activated and the tracking controller is deactivated. It is thus possible to reduce the velocity of the objective lens when the objective lens has deviated from the proper focusing position to such extent that it is no longer within the region where the focus error is correctly represented by the focus error signal. With this velocity reduction it is in turn possible to keep the objective lens in focus at a wider range of vibrations.

According to a second aspect of the invention, there is provided a method as defined independent claim 16. The method comprises generating a focus actuator control signal corresponding to the focus error signal when the central aperture signal is equal to or above a certain threshold value. Furthermore, the method comprises generating a focus actuator control signal with a predefined level when said central aperture signal is below the threshold value.

According to a third aspect of the invention, a computer-readable medium as defined in independent claim 23 is provided.

According to a fourth aspect of the invention, a focus actuator control signal as defined in claim 24 is provided. The focus actuator control signal is based on a focus error signal and a central aperture signal. The focus actuator control signal further corresponds to a focus error signal when said central aperture signal is equal to or above a threshold value. Moreover, the focus actuator control signal is a signal with a predefined level when said central aperture signal is below said threshold value.

Hence, the basic idea of the invention is to provide a focus actuator control signal for controlling a focus actuator comprised in an optical disc system, wherein the focus actuator control signal is based on a focus error signal and a central aperture signal. By providing a focus actuator control signal in accordance herewith, i.e. a focus actuator control signal that corresponds to the focus error signal when said central aperture signal is equal to or above a threshold value, and is a signal with a predefined level when said central aperture signal is below said threshold value, it is possible to extend the regions of the focus error signal where the relative distance between the focus point and the data layer of the record medium is not correctly represented by the focus error signal. This in turn enables improvements of the start-up and recovery performance of optical disc systems, especially under vibrating conditions.

The signal-processing device, method, computer-readable medium, and control signal according to the invention provide many advantages over the prior art. An advantage with the present invention is that it provides an improved device and method for reducing the influence of vibrations during start-up and recovery of an optical disc system. Another advantage with the present invention over prior art is that it provides an improved start-up and recovery of optical discs at a wider range of vibration disturbances. Yet another advantage with the invention is that it can be implemented in small-sized and increasingly compact optical disc systems. Yet a further advantage with the invention is that it provides an improved device and method that is cheap.

It should be noted that further preferred features of the invention are defined in the dependent claims.

It should also be emphasized that when used in this specification and claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. Reference signs in the claims are provided merely as a clarifying example and shall not be construed as limiting the scope of the claims in any way.

These and other aspects, features and advantages of which the invention is capable of will be apparent and elucidated from the following description of embodiments of the present invention, reference being made to the accompanying drawings, in which:

FIGS. 9 and 9A show several equations.

According to a first aspect of the invention there is provided a signal-processing device for controlling a focus actuator in an optical disc system. The signal-processing device according to the invention will now be described in conjunction with two embodiments.

Figure 3:
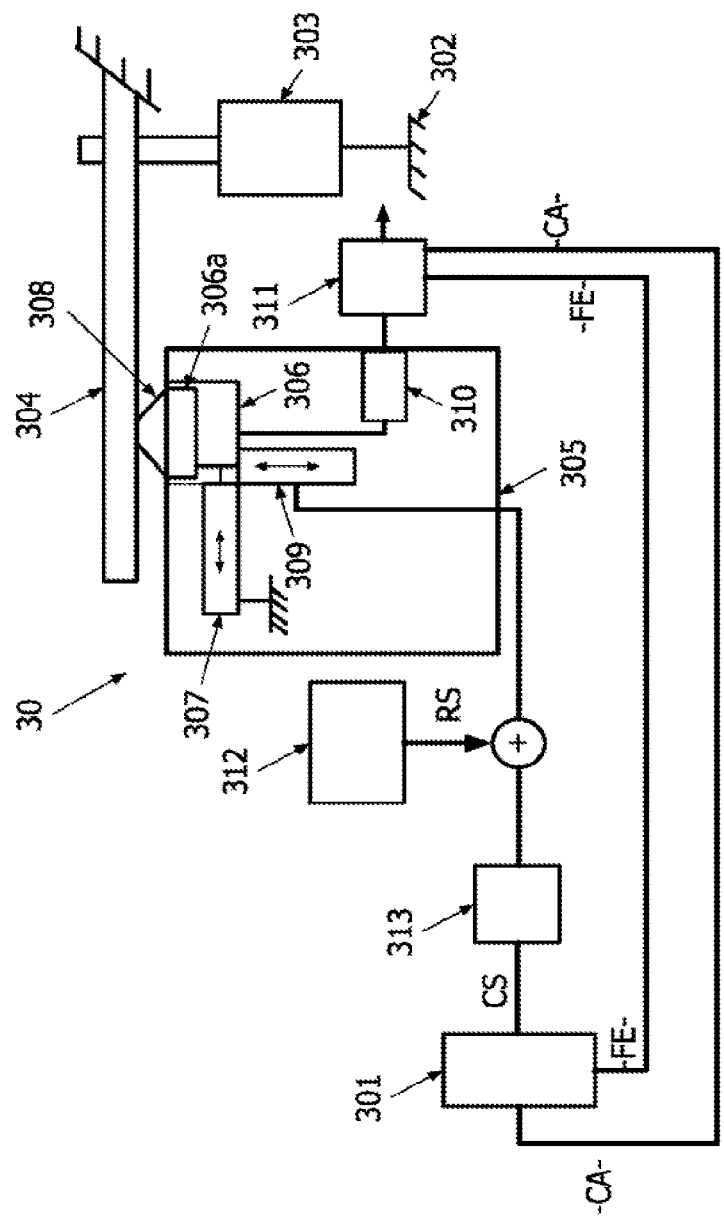
FIG. 3 illustrates a first embodiment of an optical disc system in which a signal-processing device according to the invention is implemented.

FIG. 3 illustrates a first embodiment of an optical disc system 30 in which a signal-processing device 301 according to the invention is incorporated. Accordingly, it should be appreciated by persons ordinary skilled in the art that the signal-processing device 301 can be implemented in an optical disc system. Furthermore, the optical disc system 30 is described with reference to FIG. 3 only in so far as it is relevant for the present invention.

The optical disc system 30 comprises an optical disc player or recorder 302 having a motor 303 for rotating a record medium 304. The record medium 304 is provided with a track of pits containing the digital information. The record medium 304 is preferably, but not necessarily, an optical disc such as a CD or a DVD. The optical disc system 30 also comprises an optical pick-up device 305. The optical pick-up device 305 is provided with a laser unit 306, which can be moved over the record medium 304 in a radial direction by means of a drive motor 307, which is shown schematically. The radial tracking may be implemented in various ways. Moreover, it should be appreciated by persons ordinary skilled in the art that the drive motor 307 is mainly used for coarse movements in the radial direction. It is preferred to use a so-called voice coil type of construction or the like for finer movements. The laser unit 306 further comprises an objective lens 306a which is provided in order to focus a laser beam 308 onto a data layer of the record medium 304, taking into account e.g. the refractive index of the record medium. The laser beam 308 from the laser unit 306 is focused on the record medium 304. Furthermore, a focus actuator generally denoted 309, which is preferably a voice coil construction, is capable of moving the objective lens 306a in a vertical direction relative to the record medium 304. The focus actuator 309 thus actuates the objective lens in the focus direction, i.e. to or from the record medium 304, thereby enabling the laser beam 308 to be focused onto the data layer of the record medium 304. The focus actuator 309 is configured to control the position of the focus point. In FIG. 3 the optical disc system is illustrated by having the focus actuator 309 directly below the laser unit 306. Nevertheless, the focus actuator 309 could for example also be placed inside the laser unit 306. Furthermore, the laser beam 308 which is reflected and modulated by the record medium 304 is detected by a detection unit 310 and converted into an electric signal that is applied to a processing device 311. The processing device 311 decodes and corrects the data and finally makes it available to the user. Furthermore, the processing device 311 generates a focus error signal FE and a central aperture signal CA from the optical pick-up device 305. The focus error signal FE and central aperture signal CA have already been described with reference to FIGS. 1 and 2. Again, the focus error signal FE is generally representative of a relative distance between the focus point and the data layer of the record medium 304 to be read or written by the optical disc system 30, whereas the central aperture signal CA is generally representative of the amount of reflected light from the record medium 304 to be read or written by the optical disc system 30.

So far the optical disc system 30 described hereinabove is similar to known optical disc systems. The optical disc system 30 further comprises a signal-processing device 301, to which the focus error signal FE and the central aperture signal CA are supplied. According to the invention, the signal-processing device 301 generates a focus actuator control signal CS for controlling the focus actuator 309 based on the focus error signal FE and the central aperture signal CA. The focus actuator control signal CS corresponds to the focus error signal FE when the central aperture signal is equal to or above a certain threshold value. Furthermore, the control signal CS is a signal having a predefined level when the central aperture signal CS is below the certain threshold value. The threshold value is preferably chosen to represent the transition from the A-region to the B-region of the focus error signal FE, illustrated in FIG. 1. However, equally possible the threshold value could be chosen to a value representing a focus error denoted with B* in FIG. 1. B* does not exactly represent the transition from the A-region to the B-region of the focus error signal FE. However, it is important that B* is chosen to represent a value which is near to this transition. Furthermore, B* could of course alternatively be chosen to represent a value slightly inside region A (which is near to the transition from the A-region to the B-region), however in most optical disc systems this is not preferred. To sum up, signal values of the central aperture signals CA that are above or equal to the threshold value can generally be said to represent the case when the focus error is within the A-region of the focus error signal, i.e. within the region where the relative distance between the data layer and the focus point is correctly represented.

Figure 4:
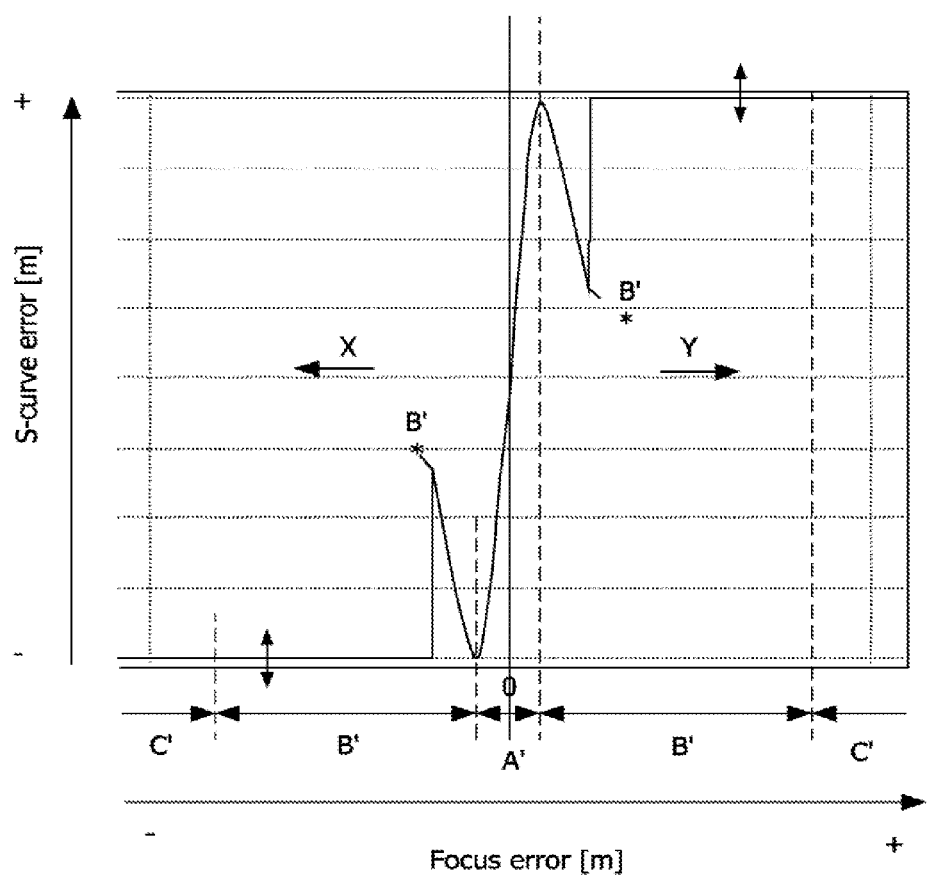
FIG. 4 illustrates a waveform chart illustrating a variation in a control signal when the central aperture signal in FIG. 2 is below a certain threshold value.

The control signal CS, which is generated in the signal-processing device 301 when the central aperture signal is below the threshold value will now be described in further detail with reference to FIG. 4. Similar to the focus error signal FE shown in FIG. 1, the control signal CS has a S-shaped characteristic. For illustrative purposes only, the control signal CS has been divided into corresponding regions A', B', and C' as the focus error signal FE. Furthermore, in this example it is to be understood that the threshold value of the central aperture signal CA, shown in FIG. 2, has been chosen to have the value which represents a signal value B'* of the focus error signal FE. The signal is S-shaped in region A' and part of region B' (i.e. up to B'*). However, contrary to the focus error signal illustrated in FIG. 1 most of region B' and region C' of the control signal have a predefined level. The predefined level is a predefined level of the S-curve error, as shown in FIG. 4. Put in other words, the control signal has an extended S-curve error in most of region B' and in region C'. The signal is therefore referred to as an "extended" S-curve. The predefined level will have a negative value when the objective lens deviates in a negative direction (X) from the proper focusing position. Similarly, the predefined level will have a positive signal value if the objective lens deviates in a positive direction (Y) from the proper focusing position.

When the objective lens deviates from the proper focusing position O on the negative side, the control signal is extended to a predetermined negative signal value in most of region B' and in region C'. In the same way, when the objective lens deviates from the proper focusing position O in a positive direction, the control signal is extended to a predetermined positive signal value in most of region B' and in region C', as is clearly illustrated in FIG. 4. The maximum extension level of the control signal corresponds to the peak value of the focus error signal illustrated in FIG. 1. For example, if the peak value of the focus error signal FE has an absolute value representing a S-curve error of 4 µm, the maximum extension level of the control signal (in most of region B' and in region C') is 4 µm. Consequently, when the focus error is negative, the predefined level can be extended to −4 µm. In the same way, when the deviation of the objective lens is in the positive direction from the proper focusing position the predefined level can be extended to +4 µm in most of region B' and in region C'. Although the maximum extension level of the control signal corresponds to the S-curve error peak value of the focus error signal it should be appreciated that other extension levels are equally possible. So, under vibrating conditions, when the objective lens has once deviated from the proper focusing position to such extent that the focus error is outside the A-region, extending the control signal in regions B' and C', respectively, has the advantage that it enables the at least one controller to determine in which direction the objective lens should be moved in order to find a proper focusing position again. The at least one controller will be further described hereinbelow. Preferably, but not necessarily, the predefined level of the control signal is variable. In other words, the extension level of the S-curve error is preferably variable. In FIG. 4 this is illustrated by arrows. This means that the predefined level of the control signal does not necessarily have to be held at constant signal value. Instead, the extension can e.g. be done by using an extension that slowly increases or decreases in time.

The optical disc system 30 illustrated in FIG. 3 further comprises at least one controller 313 configured to control the focus actuator 309. In FIG. 3 this is illustrated in that the signal-processing device 301 is operatively connected to the at least one controller 313. Nevertheless, it should be appreciated that the at least one controller 313 could equally be incorporated in the signal-processing device 301. Preferably, the at least one controller 313 is configured to control the damping operation of the focus actuator 309 and to control the tracking operation of the focus actuator 309. Thus, if the optical disc system 30 is subjected to vibrations or shocks the at least one controller is configured to first dampen the focus actuator 309 at start-up and/or recovery to such extent that the at least one controller is after that able to perform the tracking operation again. Furthermore, the control signal CS is supplied to the at least one controller 313 from the signal-processing device 301. When the central aperture signal CA is above the threshold value the focus error signal FE can be directly supplied to the at least one controller 313. However, if the objective lens has deviated from the proper focusing position to such extent that the focus error is no longer within region A of the focus error signal the intensity of the reflected light will decrease, resulting in a signal value of the central aperture signal CA that is below the threshold value. Consequently, the signal-processing device will generate a control signal CS with a predefined level, as illustrated in FIG. 4, to be supplied to the at least one controller 313. By extending the control signal in most of region B' and in region C' the at least one controller is capable of determining in which direction the objective lens should be moved in order to find a proper focusing position again.

The at least one controller 313 is further operatively connected to the optical pick-up device 305 via a ramp 312. The ramp 312 is used during start-up and recovery but not under normal play. The ramp supplies a ramp signal RS which can be added to the control signal CS in order to bring the focus point back on the data layer of the record medium 304. Thus, the ramp is used in order to satisfactorily control the behaviour of the optical disc system 30.

Figure 5:
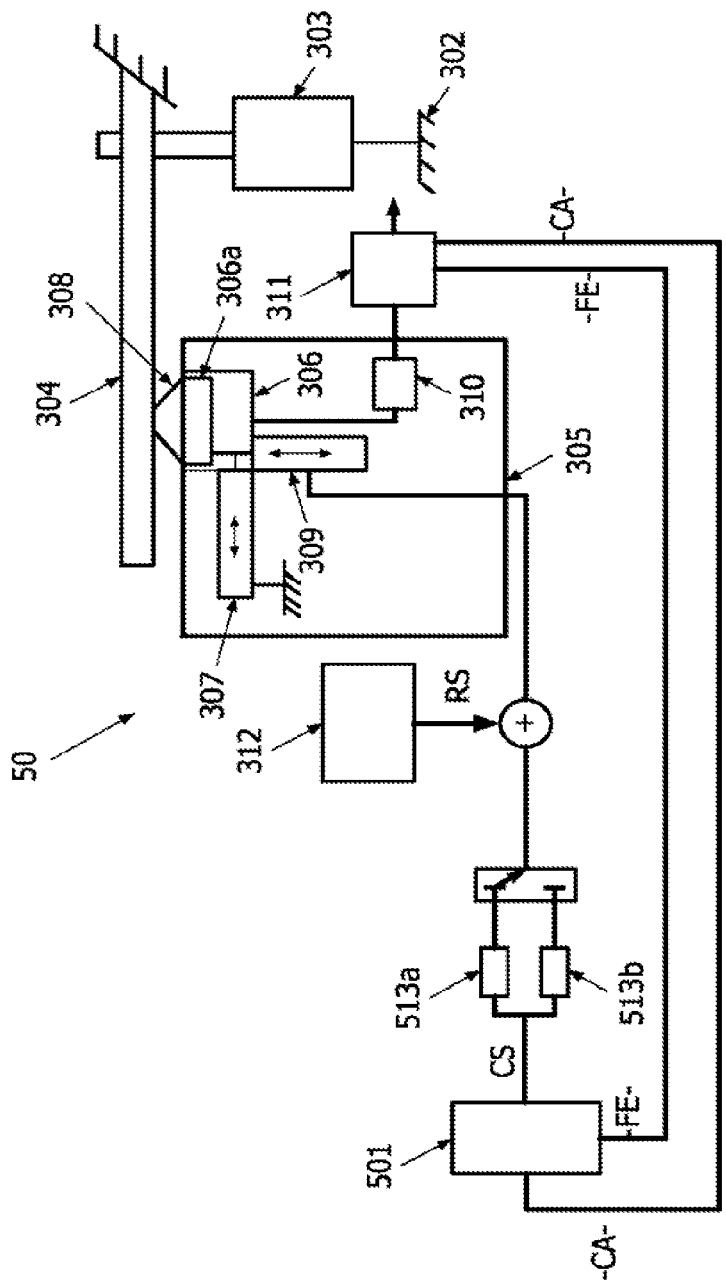
FIG. 5 illustrates a second embodiment of an optical disc system in which a signal-processing device according to the invention is implemented.

FIG. 5 illustrates a second embodiment of an optical disc system 50 in which the signal-processing device 501 according to the invention is incorporated. The second embodiment is similar to the first embodiment. Therefore, corresponding blocks are referenced with corresponding reference signs in FIG. 5. However, the second embodiment differs from the first embodiment in that it comprises two specific controllers; a damping controller 513a, which controls the damping operation of the focus actuator and a tracking controller 513b, which controls the tracking operation of the focus actuator. Preferably, but not necessarily, the damping controller 513a is a so-called PD controller and the tracking controller 513b is a so-called PID controller. In the following description of the second embodiment the damp controller 513a is a PD controller and the tracking controller 513b a PID controller. Nevertheless, it should be understood that it is equally possibly to use damping and tracking controllers other than a PD controller and a PID controller, respectively.

Figure 1:
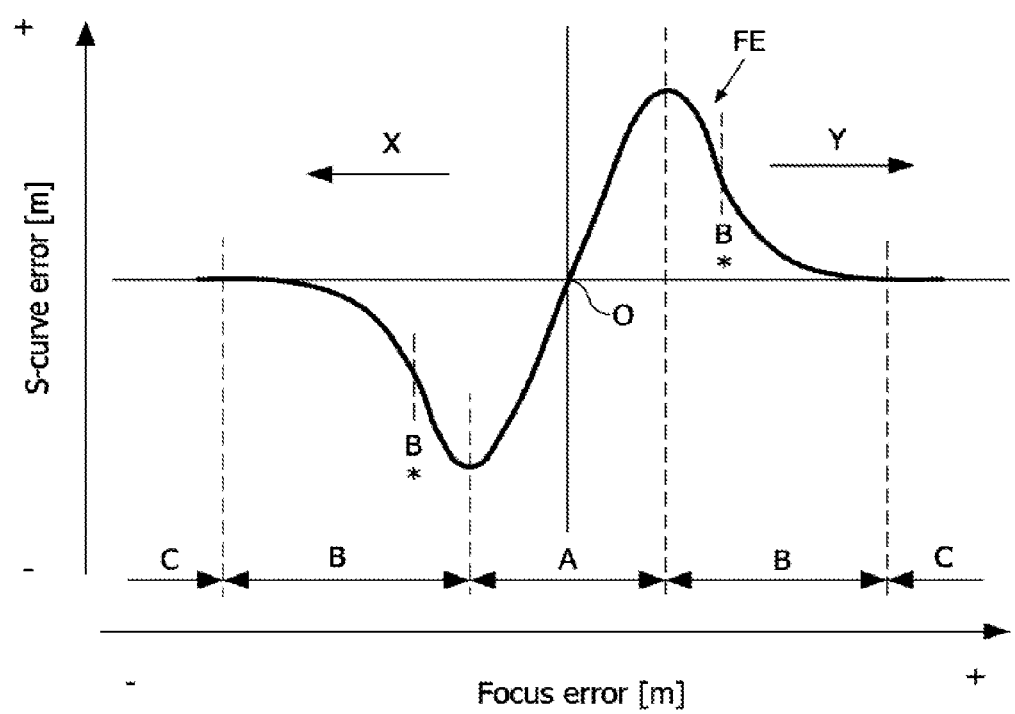
FIG. 1 illustrates a waveform chart illustrating a variation in a focus error signal. The focus error signal is shown as a function of the relative distance between a focus point and the data layer of a record medium.
Figure 2:
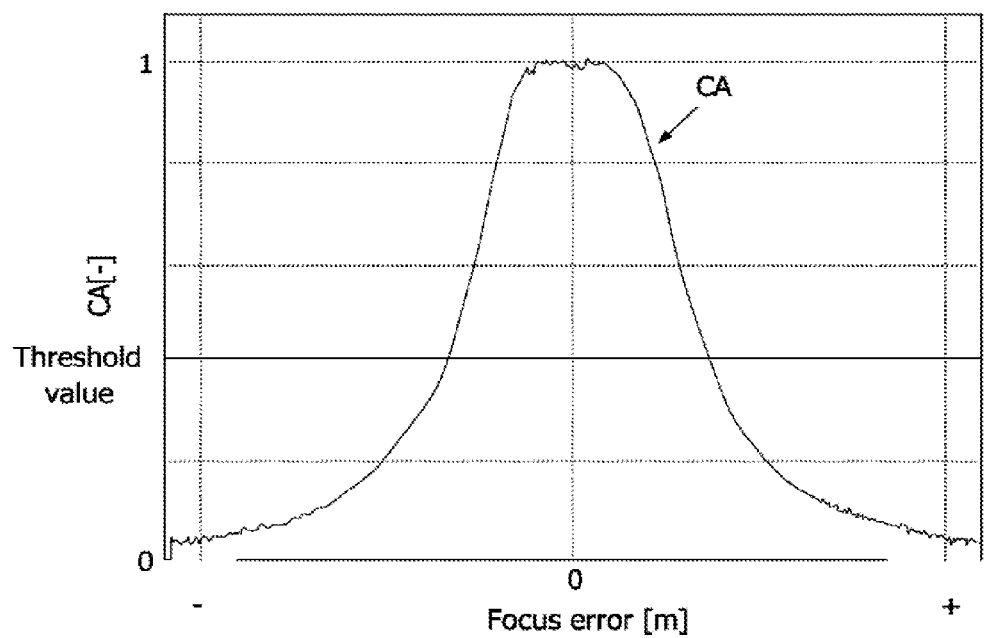
FIG. 2 illustrates a waveform chart illustrating a variation in a central aperture signal. The central aperture signal is shown as a function of the relative distance between the focus point and the data layer of a record medium.

Normally, when using a PD controller as the control device for controlling the focus actuator 309 in an optical disc system 50, a proportional 'P' action of the PD controller pushes the focus actuator 309 back like a spring when the focus error is within the A-region of the focus error signal FE illustrated in FIG. 1, while a differential 'D' action damps the focus actuator 309. In the region indicated with a B the P action still pushes the focus actuator 309 back, although with less force as the distance between the focus point and the record medium 304 becomes larger, but the D action accelerates the actuator 309 in the wrong direction. For the C-region the PD controller cannot be active. The behaviour of the PD controller in the regions indicated with B and C in FIG. 1 is unwanted.

However, in accordance with the basic idea of the present invention the signal-processing device 501 is capable of generating a control signal CS for controlling the focus actuator 309 based on the focus error signal FE and the central aperture signal CA. The control signal CS corresponds to the focus error signal FE when said central aperture signal is equal to or above the threshold value. Furthermore, the control signal is a signal with a predefined level when said central aperture signal CA is below said threshold value. Thereby, an "extended" S-curve can be generated in a corresponding manner as described previously hereinabove with regard to the first embodiment.

According to the second embodiment of the optical disc system the signal-processing device 501 is further capable of determining the velocity of a focal point of the objective lens 306a relative to the data layer of the record medium 304. In most optical disc systems 30, in which the focus actuator 309 is rigidly connected to the objective lens 306a and thus the focal point of the objective lens, it is enough to determine the velocity of the focus actuator 309 relative to the data layer of the record medium 304. However, in other systems 30 where it is possible to move the focal point of the objective lens 306a it is important to determine the velocity of the focal point of the objective lens 306a relative to the data layer of the record medium 304. Moreover, according to a first switching criteria, when the record medium passes through the focus point and the velocity (of the focal point of the objective lens 306a relative to the data layer of the record medium 304) is lower than a certain predefined value the signal-processing device 501 deactivates the PD controller 513a and activates the PID controller 513b, meaning that the tracking operation is switched on. Further, the velocity described above can e.g. be calculated using the slope of the S-curve of the focus error signal FE, shown in FIG. 1. Still further, the signal-processing device is configured to switch from the PID controller 513b to the PD controller 513b when the central aperture signal is below the threshold value, i.e. when the objective lens has deviated to such extent that the focus error is outside region A of the focus error signal. Thereby the damping operation for damping the focus actuator is switched on. This switching mechanism is important when the optical disc system 50 comprises a PD controller 513a and a PID controller 513b.

Additionally, or alternatively, a second switching criteria could also be used in accordance with the invention. According to this second criteria the signal-processing device 501 is capable of switching from the PD controller 513a to the PID controller 513b when the central aperture signal CA is equal to or above the threshold value in between two zero crossings of the S-curve, i.e. when the central aperture signal CA stays above the threshold value during two or more consecutive zero crossings of the focus error signal. In other words, when the focus error remains in region A during two or more consecutive zero crossings of the focus error signal, meaning that the focus actuator is damped sufficiently, it is possible to deactivate the PD controller 513a and to activate the PID controller 513b, thereby enabling the further tracking operation. Again, when the objective lens has deviated to such extent that the focus error is outside region A of the focus error signal the PID controller 513b is deactivated and the PD controller 513b is activated, thereby enabling the damping operation of the focus actuator.

By enabling switching between the PD controller 513a and the PID controller 513b, the velocity of the focal point of the objective lens 306a relative to the data layer of the record medium 304 when the record medium 304 passes through the focus point can be satisfactorily controlled. This is important for the start-up and recovery performance of the optical disc system 50.

In conclusion, by providing a combination of an "extended" S-curve and a control of the PD controller 513a and the PID controller 513b it is possible to reduce the velocity of the focus actuator 309 if necessary and thereby enabling an improved start-up and/or recovery behaviour of the optical disc system 50.

Figure 6:
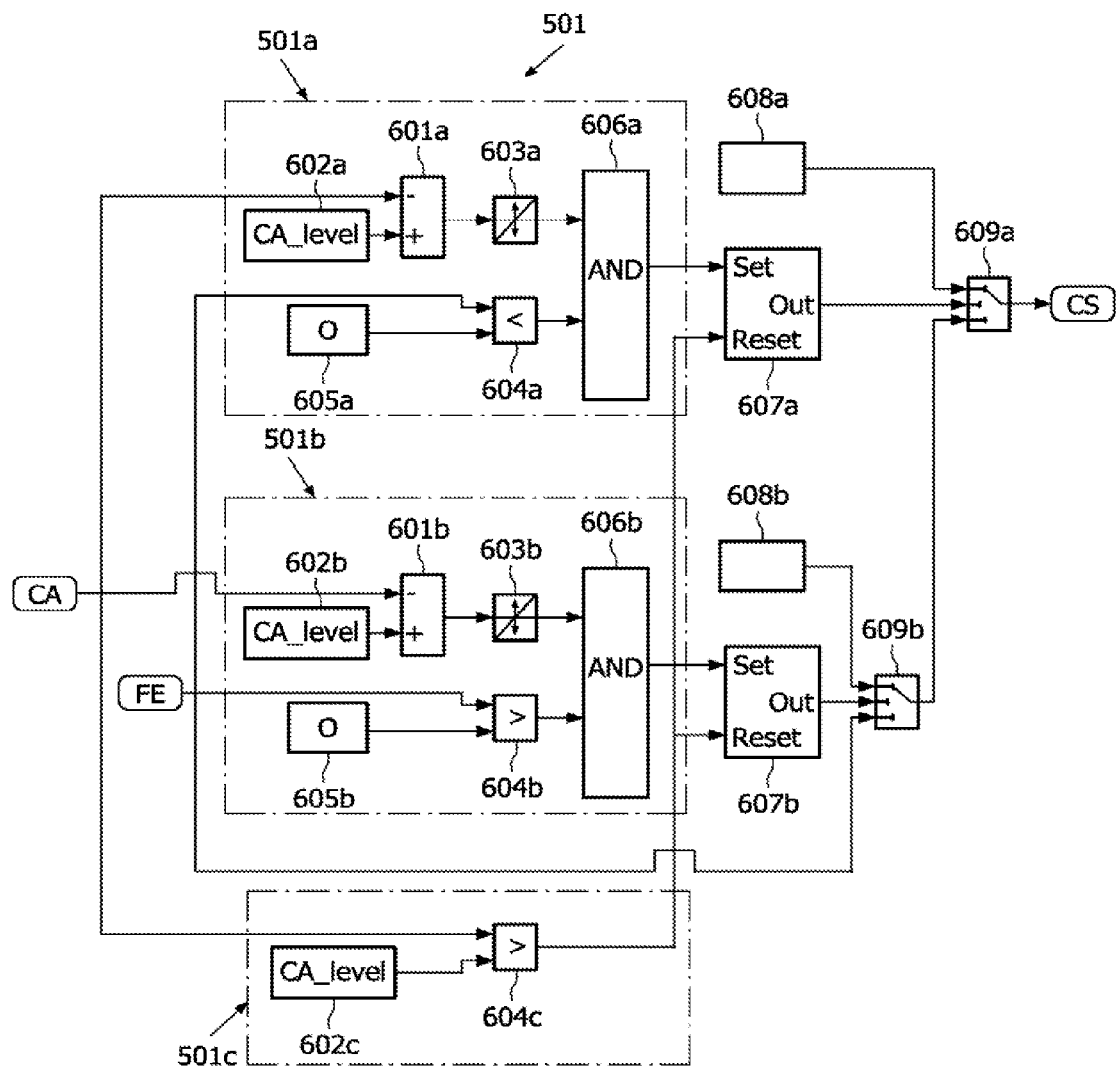
FIG. 6 illustrates a block diagram of a preferred embodiment of the signal-processing device that is implemented in the optical disc system of FIG. 5.

A preferred embodiment of the signal-processing device 501 will now be described. FIG. 6 illustrates a schematic block diagram of a preferred embodiment of the signal-processing device 501 that is implemented in the optical disc system 50. As can be seen, the signal-processing device 501 comprises several blocks.

By way of introduction, the focus error signal FE and the central aperture signal CA are supplied to the signal-processing device 501, which detects these signals. The signal-processing device 501 comprises a first circuit part 501*a* that is represented by a dash-dotted line. The first circuit part 501*a* comprises a sum-block 601*a* with two input terminals. A first input terminal of the sum-block 601*a* is supplied with the central aperture signal CA. A second input terminal is supplied with a constant signal, hereinbelow called the CA_level signal. This CA_level signal corresponds to the threshold value of the central aperture signal CA and is supplied from a CA_level block 602*a*. The central aperture signal CA is subtracted from the CA_level signal in the sum-block 601*a* and the resulting signal is supplied to a zero detection block 603*a*. If the resulting signal equals zero, i.e. the central aperture signal equals the CA_level signal, the outputted signal from the zero detection block 603*a* will be a digital 1. Furthermore, the first circuit part 501*a* comprises a comparing block 604*a* having two input terminals. A first input terminal of the comparing block 604*a* is supplied with the focus error signal FE from the optical pick-up device 305 while a second terminal is supplied with a constant signal outputted from a generating block 605*a*. The constant signal, which is generated in the generating block 605*a*, is a 0 and represents a focus error equal to zero, i.e. the objective lens is at a proper focusing position. The comparing block 604*a* then outputs a signal having a digital 1 if the focus error signal FE is below (<) zero. Hence, if the focus error at the moment is below zero the outputted signal from the comparing block will become a digital 1. Accordingly, if the focus error at the moment is above zero the outputted signal from the comparing block will become 0. Moreover, the circuit part 501*a* comprises an AND-block 606*a* with two input terminals. The first input terminal of the AND-block 606*a* is supplied with the signal that is outputted from the zero detection block 603*a*, whereas the second terminal is supplied with the signal that is outputted from the comparing block 604*a*. Furthermore, the AND-block 606*a* outputs a signal having a digital 1 if both input signals are a digital 1. Otherwise, the outputted signal has an output of a digital 0.

The signal-processing device 501 also comprises a second circuit part 501*b*, which is represented by another dash-dotted line. The second circuit part 501*b* comprises a sum-block 601*b* with two input terminals. A first input terminal of the sum-block 601*b* is supplied with the central aperture signal CA. A second input terminal is supplied with a constant CA_level signal, in the same way as in the first circuit part 501*a*. Similarly, the CA_level signal corresponds to the threshold value of the central aperture signal. It is supplied from a CA_level block 602*b*. The central aperture signal CA is subtracted from the CA_level signal in the sum-block 601*b* and the resulting signal is supplied to a zero detection block 603*b*. If the resulting signal equals zero, i.e. the central aperture signal equals the CA_level signal, the outputted signal from the zero detection block 603*b* will have a digital 1.

Furthermore, the second circuit part 501*b* comprises a comparing block 604*b* having two input terminals. A first input terminal of the comparing block 604*b* is supplied with the focus error signal FE whereas a second terminal is supplied with a constant signal outputted from a generating block 605*b*. The constant signal, which is generated in the generating block 605*b*, is a 0 and represents a case when the objective lens is at a proper focusing position. The comparing block 604*b* then outputs a signal having a digital 1 if the focus error signal FE is equal to or exceeds (>) zero, i.e. if the deviation is in the positive direction. Hence, if the focus error at the moment is above zero the outputted signal from the comparing block will become a digital 1. Accordingly, if the focus error at the moment is below zero the outputted signal from the comparing block 604*b* will become 0. Moreover, the circuit part 501*b* comprises an AND-block 606*b* with two input terminals. The first terminal of the AND-block 606*b* is supplied with the signal that is outputted from the zero detection block 603*b*, whereas the second terminal is supplied with the signal that is outputted from the comparing block 604*b*. Furthermore, the AND-block 606*b* outputs a signal having a digital 1 if both input signals are 1. Otherwise, the outputted signal has an output of digital 0.

The signal-processing device 501 also comprises a third circuit part 501*c* represented by dashed-dotted lines. This circuit part comprises a comparing block 604*c* having two input terminals. A first terminal is supplied with the central aperture signal CA, while a second input terminal is supplied with a constant CA_level signal. Again, the CA_level signal corresponds to the threshold value of the central aperture signal. The CA_level signal is supplied from a CA_level block 602*c*. The comparing block 604*c* outputs a signal having a digital 1 if the central aperture signal CA is equal to or above the CA_level signal. Otherwise, the outputted signal has a digital 0. Hence, if the central aperture signal is at the moment equal to or above the certain threshold value, the outputted signal from the comparing block will become a digital 1. On the other hand, if the central aperture signal is at the moment below the CA_level signal, i.e. below the certain threshold value, the outputted signal from the comparing block will become a digital 0.

The output signal from the AND-block 606*a* is supplied to a first input terminal of a first Set-Reset block 607*a*. A second input terminal of the Set-Reset block 607*a* is supplied with the output signal from the comparing block 604*c*. The first Set-Reset block 607*a* outputs a digital 1 if the signal at the first input terminal is a digital 1 and holds this value until the second input terminal receives the value of a digital 1.

The output signal from the AND-block 606*b* is supplied to a first input terminal of a second Set-Reset block 607*b*. A second input terminal of the Set-Reset block 607*b* is supplied with the output signal from the comparing block 604*c*. The second Set-Reset block 607*b* outputs a digital 1 if the signal at the first input terminal is a digital 1 and holds this value until the second input terminal receives the value of 1.

Furthermore, the signal-processing device 501 comprises first and second generating blocks, 608*a* and 608*b*, respectively. These generating blocks are configured to generate a control signal with a predefined level when the central aperture signal is below the threshold value. In other words, when the central aperture signal is below the CA_level signal these generating blocks are configured to generate a control signal with a predefined level. Thus an "extended" S-curve can be generated. The generating block 608*a* is used when the focus error has a negative sign whereas the generating block 608*b* is used when the focus error has a positive sign. Accordingly, if an objective lens deviates from the proper focusing position the sign of said deviation is first determined. This is accomplished by means of the comparing blocks 604*a* and 604*b*, respectively. If the sign is negative the first generating block 608*a* can be activated. On the other hand, if the focus error has a positive sign the second generating block 608*b* can be activated.

The signal-processing device 501 further comprises two switching blocks, 609*a* and 609*b*, respectively. The switching block 609*b* has three input terminals. The first input terminal is supplied with the output signal from the generating block 608*b*. The second terminal is supplied with the output signal from the second Set-Reset block 607*b*. The third input terminal is supplied with the focus error signal FE. The switching block 609*b* switches between the signals of the first and third input terminals based on the signal of the second input terminal. So, if the Set-Reset block 607*b* is set (gives a digital 1) the switching block 609*a* switches the output from the third input terminal to the first input terminal thereby outputting a control signal with an extension level at the positive side. The switching block 609*a* works similarly to the switching block 609*b*. The switching block 609*a* also comprises three input terminals. The first input terminal is supplied with the output signal from the generating block 608*a*. The second terminal is supplied with the output signal from the first Set-Reset block 607*a*. The third input terminal is supplied with the output signal from the switching means 609*b*. The switching block 609*a* switches between the signals of the first and third input terminals based on the signal of the second input terminal. Consequently, if the Set-Reset block 607*a* is set (gives a digital 1) the switching block 609*b* switches the output from the third input terminal to the first input terminal thereby outputting a control signal with an extension level at the negative side. Furthermore, the output signal from the switching block 609*a* is the control signal that is used for controlling the focus actuator in the optical disc system, in which the signal-processing device 501 is implemented.

Consequently, in accordance with this embodiment of the signal-processing device 501, if the central aperture signal CA exceeds the CA_level signal supplied from the CA_level block 602*c*, the comparing block 604*c* will output a digital 1, thereby resetting the Set-Reset blocks 607*a* and 607*b*, respectively. If these blocks receive a digital 1 at their respective second terminals the output signal from these blocks will have a digital 0. This in turn enables the focus error signal FE to be passed as the control signal CS. If the central aperture signal is below said threshold value the sign of the deviation of the objective lens can be detected. This is achieved by means of the comparing blocks 604*a* and 604*b*, respectively, as described previously. If the sign is positive a control signal CS having a positive "extended" predefined level can be generated by the generating block 608*b*. Likewise, a control signal CS with a negative signal value can be generated by the generating block 608*a* if the deviation of the objective lens has a negative sign.

Although a preferred embodiment of the signal-processing device 501 for implementation in an optical disc system 50 has been described hereinabove it should be appreciated by persons ordinary skilled in the art that there are multiple other possible embodiments of a signal-processing device 501. For example, one could imagine an alternative signal-processing device 501 provided with a look-up table having therein a list of predefined levels of possible signal values of the focus error signal FE and the central aperture signal CA. After having detected the focus error signal FE and the central aperture signal CA a control signal could be generated by the signal-processing device 501 in dependence of the signal values of the detected focus error signal FE and the central aperture signal CA.

According to a second aspect of the invention there is provided a method of controlling a focus actuator in an optical disc system based on a focus error signal FE and a central aperture signal CA. Again, the focus error signal primarily corresponds to a relative distance between a focus point and a data layer of the record medium to be read by the optical disc system. Also, the central aperture signal corresponds to an amount of reflected light from a record medium to be read or written by said optical disc system.

Figure 7:
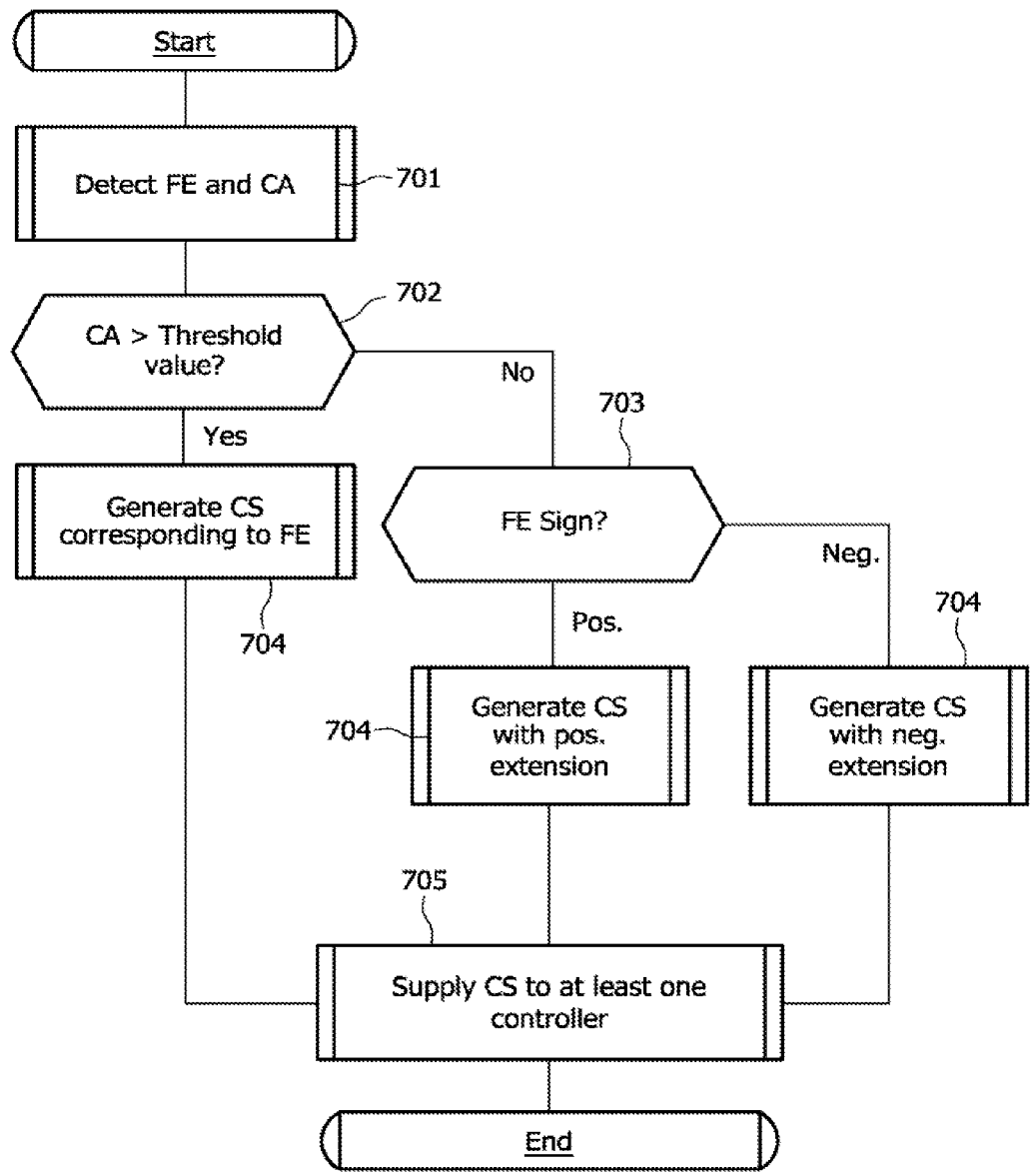
FIG. 7 illustrates a flowchart of a first embodiment of a method of controlling a focus actuator in an optical disc system.

FIG. 7 illustrates a flowchart showing a first embodiment of the method 70 according to the invention. The first embodiment of the method is preferably, but not necessarily, used in an optical disc system 30 according to the first embodiment described hereinabove. In step 701 the central aperture signal CA and the focus error signals FE are detected. Preferably, but not necessarily, this step is accomplished by means of a signal-processing device 301 previously described hereinabove. Furthermore, in the next step 702 it is determined whether the central aperture equals to or is above a certain threshold value. Again, this threshold value is preferably representative of the transition from the A-region to the B-region of the focus error signal FE, illustrated in FIG. 1. When the signal value of the central aperture signal equals to or is above the certain threshold value the method proceeds to step 704, in which a control signal is generated. However, when the central aperture signal value is below the threshold value it is determined which sign the focus error signal has. This is done in step 703. If the objective lens deviates in the positive direction illustrated in FIG. 1 it will have a positive sign. Likewise, if the objective lens deviates in the negative direction from the proper focusing position it will have a negative sign.

The most important step of the method is step 704. In this step a control signal CS is generated. The control signal CS corresponds to the focus error signal FE when the central aperture signal is equal to or above the threshold value, i.e. when the focus error is within region A of the focus error signal. Otherwise, i.e. when the signal value of the central aperture signal is below the threshold value, the control signal is generated to have a predefined level. The control signal CS that is generated when the central aperture signal CA is below the certain threshold value has already been described in detail with reference to FIG. 4 and will therefore not be described in further detail in conjunction with the method according the invention. Step 704 also comprises the further step of generating the control signal in dependence of the sign of the focus error signal, which sign has been determined in step 703. If the sign is positive the control signal will be generated to have a positive extension. Similarly, if the objective lens deviates in the negative direction from the proper focusing position a focus actuator control signal will be generated to have a negative predefined signal value.

In step 705 the control signal CS is supplied to at least one controller for further control of the focus actuator based on the control signal CS. Preferably, but not necessarily, step 705 comprises controlling the damping operation of the focus actuator and controlling the tracking operation of the focus actuator. Thus, if the optical disc system is subjected to vibrations or shocks, it is possible to first dampen the focus actuator at start-up and/or recovery to such extent that it is then possible to perform the tracking operation again.

A second embodiment of the method according to a second embodiment of the method 80 will now be described with reference to FIG. 8. The second embodiment of the method is similar to the first embodiment of the method up to step 704. Therefore, corresponding reference signs have been used in FIG. 8 for the corresponding method steps shown in FIG. 7. The method according to the second embodiment is preferably used in an optical disc system 50 according to the second embodiment described hereinabove.

The method according to this embodiment differs from the first embodiment in that it further comprises steps 805, 806 and 807, respectively. First, in step 702 it has been determined whether or not the central aperture signal is equal to or above the threshold value. If the central aperture is below the threshold value a damping controller, such as a PD controller, that controls the damping operation of the focus actuator, can be activated. Furthermore, under this condition a tracking controller, such as a PID controller, that controls the tracking operation of the focus actuator, can be deactivated. Accordingly, the damping operation of the focus actuator is switched on. This is performed in step 807 as shown in FIG. 8. If the central aperture is equal to or above the threshold value the velocity of the focal point of an objective lens relative to the data layer of the record medium is detected, in step 805. When the record medium to be read or written by the optical disc system passes through a focus point of the optical disc system and when said velocity is lower than a predefined value the damping controller will be deactivated and the tracking controller activated in step 806. Thus the tracking operation is switched on.

Alternatively, a second switching criteria could also be used in combination with the first switching criteria in step 805. Still another alternative is to replace the first switching criteria with the second switching criteria in step 805. According to this second criteria the damping controller is deactivated and the tracking controller is activated when the central aperture signal CA is equal to or above the threshold value in between two zero crossings of the S-curve, i.e. when the central aperture signal CA stays above the threshold value during two or more consecutive zero crossings of the focus error signal. In other words, when the focus error remains in region A of the focus error signal during two or more consecutive zero crossings of the focus error signal, meaning that the focus actuator is damped sufficiently, it is possible to deactivate the damping controller and to activate the tracking controller. Thereby it is possible to switch on the tracking operation of the focus actuator without using the "extended" focus actuator control signal CS.

The method according to the invention is capable of improving start-up and/or recovery behaviour of an optical disc system by providing a combination of an "extended" S-curve and a control of the damping controller and the tracking controller.

According to a third aspect of the invention there is provided a computer-readable medium that is implemented in an optical disc system. Embodied on the computer-readable medium there is a computer program for processing by a computer. In accordance with the invention the computer program comprises a code segment for performing the method according to the second aspect of the invention. Since the method according to the invention has already been described hereinabove it will not be described further here.

According to yet another aspect of the invention there is provided a control signal CS for controlling a focus actuator in an optical disc system. The control signal CS is based on a focus error signal FE and a central aperture signal CA. Again, the focus error signal FE generally corresponds to a relative distance between a focus point and a data layer of the record medium to be read or written by the optical disc system. Also, the central aperture signal CA corresponds to an amount of reflected light from a record medium to be read by said optical disc system. Yet further, the control signal CS corresponds to the focus error signal FE when said central aperture signal is equal to or above a threshold value. Again, this threshold value is preferably chosen to represent the transition from the A-region to the B-region of the focus error signal FE, illustrated in FIG. 1. Still further, the control signal is generated to be a signal with a predefined level when said central aperture signal is below said threshold value. The control signal that is generated when the central aperture signal CA is below the certain threshold value has already been described in detail with reference to FIG. 4 and will not be described further herein.

So far the invention has been described with reference to different aspects of the invention when the record medium to be read or written by the optical disc system is substantially perfect. However, sometimes there are black dots, scratches or fingerprints or other disc defects present on the record medium that is to be read or written by the optical disc system. It can thus happen that the record medium goes through the focus point without the signal-processing device registering this. If the focus point is crossed by the record medium during a defect the focus error may have the wrong sign. If so, this would result in a control input with the wrong sign and the focus actuator would be pushed away from the data layer of the record medium instead of towards it as is desired. With this the focus actuator is pushed away until it reaches either the record medium in one direction or the chassis of the optical-pick up device in the other direction and remains at this position. The control input stays at a constant value and the focus actuator might overheat. Moreover, if the focus actuator is pushed towards the record medium it might hit the record medium and both the record medium and the focus actuator may be severely damaged. In the following it will be described how these scenarios can be prevented by the invention. In this example it is to be understood a signal-processing device 501 according to the second embodiment is used.

Preventing overheating: The maximum allowable current through an optical pick-up device 305 can be found in the specification of the optical pick-up device used. For example, an optical pick-up device 305 may have a maximum allowable continuous current through the optical pick-up device 305 that is 120 mA. During a time period of two seconds a current of 240 mA is therefore allowed. When using the resistance of a coil R of 7.6Ω the allowable voltage can be calculated by formula 1 in FIG. 9. Accordingly, the maximum allowable continuous voltage equals 0.912 V. During two seconds a voltage of 1.824V is therefore allowed. Imagine that the "extended" part of the control signal shown in FIG. 4 is kept constant at a value of 4 μm. The voltage of the PD controller at the extended part is dependent on the P action of the PD controller for $s \downarrow 0$ (note that this is the case only when the extension level is constant). This results in equation 2 of FIG. 9, where P is the PD controller gain. The PD controller gain is dependent on the desired bandwidth of the controlled optical disc system 50. The PD controller gain can be calculated as a function of the desired bandwidth $\omega_{BW}$ [rad/s] using the transfer functions of the optical pick-up device 305 and the PD controller 513a. The transfer function of the optical pick-up device is shown in equation 3 of FIG. 9. Furthermore, equation 4 of FIG. 9 shows the transfer function of the PD controller 513a with low-pass filter. In this example the PD controller 513a is implemented as a lead filter with zero at $\omega_{BW}/3$ and pole at $\omega_{BW}*3$ and a low-pass filter with pole at $\omega_{BW}*10$.

Figure 8:
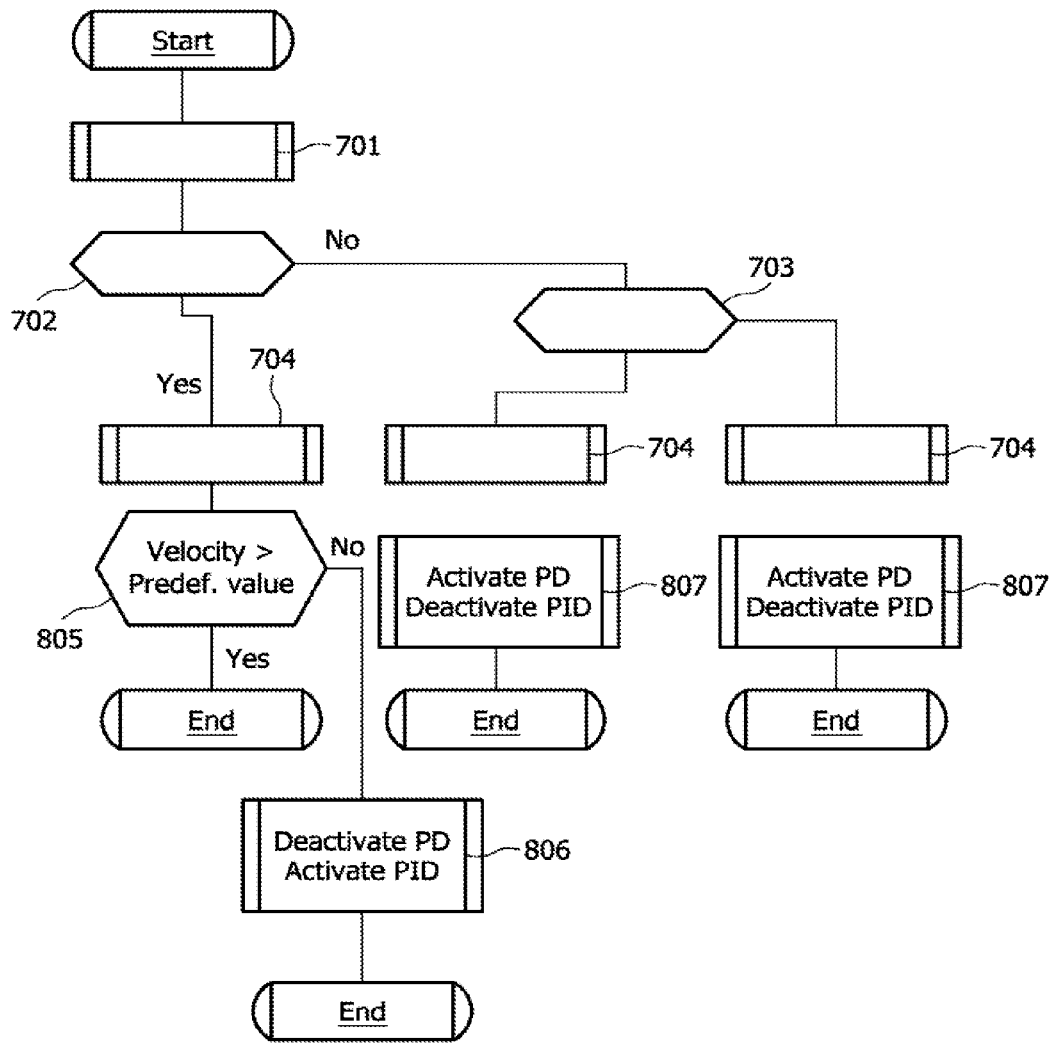
FIG. 8 illustrates a flowchart of a second embodiment of a method of controlling a focus actuator in an optical disc system.

The gain of the PD controller 513a must have a value such that a open loop transfer function, shown in equation 5 of FIG. 8, has an amplitude of 0 dB at the desired bandwidth, $|CH|_{\omega_{BW}}=0$ dB=1. The open loop transfer function is shown in eq. 5. Using eq. 5 and $|CH|_{\omega_{BW}}=0$ dB=1 an expression for the PD controller gain P as a function of the model parameters and the bandwidth can be derived. Since the amplitude is 1 at the frequency of the bandwidth is $s=j\omega_{BW}$, see eq. 6 and 7.

Furthermore, using eq. 9 of FIG. 9A the gain of the PD controller with the low-pass filter can be calculated for each bandwidth $\omega_{BW}$ [rad/s]. The voltage of the PD controller 513a at the extended part can thus be calculated as function of the bandwidth using eq. 9 and 2. For instance, the maximum allowable continuous voltage of 0.912 V is reached at a bandwidth of approximately 1 kHz. The maximum allowable voltage during 2 seconds of 1.824 V is reached at a bandwidth of approximately 1.4 kHz. The knowledge of the maximum allowable voltage for a certain period of time can then be used in order to determine how long the focus actuator can stay in the extended part of the control signal CS in order to prevent overheating.

Preventing hitting the CD: The maximum distance between the focus actuator 306 and the record medium 304 is dependent on the optical pick-up device used. For example, an optical pick-up device 305 may have this distance to be specified to a distance of 1.61 mm. In this example, due to the maximum vertical deviation of the record medium 304 of 0.5 mm this distance has to be reduced to 1.11 mm (note however that the maximum vertical deviation of the record medium can differ for different kinds of media). The voltage of the PD controller at the extended part of the S-curve can be calculated using eq. 2 in FIG. 9. Again, the gain of the PD controller is dependent on the bandwidth of the controlled optical disc system 50 and can be calculated using eq. 9 of FIG. 9A. The focus actuator position that is reached because of the ramp 312 can be calculated using $$U_{ramp} = \frac{R_k}{B_l} X_{end}.$$

The remaining distance to the record medium 304 has a value of $\partial=(1.11-X_{u_0})$ mm. The time at which the record medium 304 is reached can be determined using a step response with the end value of the step at the controller voltage at the extended part of the S-curve. The time at which the position a is reached is an indication for the maximum time the focus actuator can stay in the extended part of the control signal CS before hitting the record medium 304.

By tracking for each bandwidth the minimum and maximum time over all ramp values the time range before reaching the record medium 304 can be determined as a function of the bandwidth. In this example, up to a bandwidth of 356 Hz the record medium 304 is never reached. This is because the voltage of the PD controller 513a at the extended part of the S-curve leads to a focus actuator position, which is together with the position due to the ramp always smaller than 1.11 mm.

At its maximum the ramp has a voltage of 1.28 V. A voltage of 1.28 V corresponds to a position of the focus actuator of 0.95 mm. The minimal distance to the record medium is 0.15 mm. The PD controller voltage for the extended part up to a bandwidth of 356 Hz leads to a position, which is smaller than 0.15 mm. For instance, given a bandwidth of 356 Hz the voltage of the PD controller according to this example equals 0.1152 V at the "extended" part of the S-curve.

In this example, the maximum allowable predefined "extended" S-curve level at the positive side depends on the bandwidth of the controlled optical disc system such that the voltage of the PD controller at the positive "extended" part equals 0.1152 V. In this way, the focus actuator can never hit the record medium 304. In this example, the "extended" S-curve at the negative side is given the maximum possible extension level.

It should be appreciated by persons ordinary skilled in the art that the present invention could be implemented in any suitable form including hardware, software, firmware or any combination of these. However, preferably, the invention is implemented as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Although the present invention has been described above with reference to specific aspects and embodiments of the invention, it is not intended to be limited to the specific form set forth herein. Rather, the invention is limited only by the accompanying claims and, other embodiments than the specific above are equally possible within the scope of these appended claims, e.g. different constructions of the signal processing device for enabling generation of a focus actuator control signal corresponding to a focus error signal when a central aperture signal is equal to or above a threshold value, and is a signal with a predefined level when said central aperture signal is below said threshold value.

The invention claimed is:

1. A signal-processing device for controlling a focus actuator in an optical disc system, wherein said signal-processing device is configured to:
  generate a focus actuator control signal for controlling said focus actuator based on a focus error signal and a central aperture signal; wherein
  when said central aperture signal is equal to or above a threshold value, said focus actuator control signal corresponds to the focus error signal and when said central aperture signal is below said threshold value, said focus actuator control signal is a signal with a fixed value.

2. The signal-processing device according to claim 1, wherein said focus error signal corresponds to a relative distance between a focus point and a data layer of a record medium to be read or written by said optical disc system, wherein said focus point is a focal point of an objective lens.

3. The signal-processing device according to claim 2, wherein the focus actuator is configured to control the position of the focus point.

4. The signal-processing device according to claim 1, wherein said central aperture signal corresponds to an amount of reflected light from a record medium to be read or written by said optical disc system.

5. The signal-processing device according to claim 1, wherein the fixed value of the focus actuator control signal is variable.

6. The signal-processing device according to claim 1, further configured to:
  detect the central aperture signal, and
  determine whether the central aperture signal is equal to or above the threshold value.

7. The signal-processing device according to claim 6, further configured to:
  detect the focus error signal, and
  when said central aperture signal is below said threshold value further determine whether a sign of the focus error signal is positive or negative; and
  generate the focus actuator control signal in dependence of the sign.

8. The signal-processing device according to claim 1, further comprising at least one controller configured to control the focus actuator.

9. The signal-processing device according to claim 8, wherein said at least one controller is configured to control the damping operation and the tracking operation of the focus actuator.

10. The signal-processing device according to claim 1, further comprising:
a damping controller configured to control the damping operation of said focus actuator; and
a tracking controller configured to control the tracking operation of said focus actuator.

11. The signal-processing device according to claim 10, wherein said signal-processing device is further configured to determine the velocity of a focal point of an objective lens relative to the data layer of the record medium and to deactivate the damping controller and activate the tracking controller when the record medium passes through the focus point and said velocity is lower than a predefined value.

12. The signal-processing device according to claim 10, wherein said signal-processing device is further configured to deactivate the damping controller and activate the tracking controller when the central aperture signal is equal to or above the threshold value during two or more consecutive zero crossings of the focus error signal.

13. The signal-processing device according to claim 10, wherein said signal-processing device is further configured to activate the damping controller and deactivate the tracking controller when the central aperture signal is below the threshold value.

14. The signal-processing device according to claim 10, wherein said damping controller is a PD controller, and said tracking controller is a PID controller.

15. The signal-processing device according to claim 1, wherein said signal-processing device is incorporated in an optical disc system.

16. A method of controlling a focus actuator in an optical disc system based on a focus error signal and a central aperture signal, wherein said method comprises:
generating a focus actuator control signal corresponding to the focus error signal when said central aperture signal is equal to or above a threshold value; and
generating a focus actuator control signal with a fixed value when said central aperture signal is below said threshold value.

17. The method according to claim 16, further comprising:
supplying the focus actuator control signal to at least one controller for further control of the focus actuator based on the focus actuator control signal.

18. The method according to claim 16, further comprising:
detecting the central aperture signal, determining whether the central aperture signal is equal to or above the threshold value.

19. The method according to claim 18, further comprising:
detecting the focus error signal, and
when said central aperture signal is below said threshold value further determining whether a sign of the focus error signal is positive or negative; and
generating the focus actuator control signal in dependence of the sign.

20. The method according to claim 16, further comprising:
determining the velocity of a focal point of an objective lens relative to a data layer of a record medium to be read or written by the optical disc system; and
when the record medium passes through a focus point of the optical disc system and said velocity is lower than a predefined value,
deactivating a damping controller that controls the damping operation of the focus actuator, and
activating a tracking controller that controls the tracking operation of the focus actuator.

21. The method according to claim 16 further comprising:
determining if the central aperture signal is equal to or above the threshold value during two or more consecutive zero crossings of the focus error signal, and when so;
deactivating a damping controller that controls the damping operation of the focus actuator, and
activating a tracking controller that controls the tracking operation of the focus actuator.

22. The method according to claim 16, further comprising, when the central aperture signal is below the threshold value,
activating a damping controller that controls the damping operation of the focus actuator, and
deactivating a tracking controller that controls the tracking operation of the focus actuator.

23. A computer-readable medium incorporated in an optical disc system and having embodied thereon a computer program for processing by a computer, the computer program comprising a code segment for performing the method according to claim 16.

24. A focus actuator control signal used in an optical disc system for controlling a focus actuator, wherein said focus actuator control signal is based on a focus error signal and a central aperture signal; and wherein said focus actuator control signal corresponds to a focus error signal when said central aperture signal is equal to or above a threshold value, and is a signal with a level fixed value when said central aperture signal is below said threshold value.

* * * * *